United States Patent
Sommerfeld

(10) Patent No.: US 7,156,471 B2
(45) Date of Patent: Jan. 2, 2007

(54) TWO-STAGE CYLINDER FOR APPLYING AUTOMATIC SET AND RELEASE HAND BRAKE

(75) Inventor: Howard Sommerfeld, Oak Forest, IL (US)

(73) Assignee: WABTEC Holding Corp., Wilmerding, PA (US)

( * ) Notice: Subject to any disclaimer, the term of this patent is extended or adjusted under 35 U.S.C. 154(b) by 67 days.

(21) Appl. No.: 10/975,331

(22) Filed: Oct. 28, 2004

(65) Prior Publication Data

US 2006/0097566 A1 May 11, 2006

(51) Int. Cl.
*B60T 13/74* (2006.01)
*B61H 13/00* (2006.01)

(52) U.S. Cl. .............................. 303/2; 303/13; 303/15; 188/33; 188/107

(58) Field of Classification Search ............... 303/2, 303/7, 9, 13, 15, 71, 9.76; 188/33, 105, 107, 188/153 R, 170; 74/504, 505
See application file for complete search history.

(56) References Cited

U.S. PATENT DOCUMENTS

| | | | | |
|---|---|---|---|---|
| 2,940,554 | A * | 6/1960 | Cameron ................. | 188/153 R |
| 3,717,386 | A * | 2/1973 | Edmansson et al. .......... | 303/89 |
| 3,782,785 | A * | 1/1974 | Budzich ................. | 303/115.3 |
| 3,891,277 | A * | 6/1975 | Cope ............................. | 303/2 |
| 3,937,295 | A * | 2/1976 | Wright ........................ | 180/271 |
| 3,954,304 | A * | 5/1976 | Engle ........................... | 303/13 |
| 4,033,629 | A * | 7/1977 | Spalding ........................ | 303/2 |
| 4,296,707 | A * | 10/1981 | Kennedy ................... | 116/58 A |
| 4,368,927 | A * | 1/1983 | Billingsley et al. ............ | 303/18 |
| 4,368,928 | A * | 1/1983 | Billingsley et al. ............ | 303/18 |
| 4,525,011 | A * | 6/1985 | Wilson ....................... | 303/19 |
| 4,703,623 | A * | 11/1987 | Dalibout et al. ............... | 60/577 |
| 4,934,214 | A * | 6/1990 | Otte ............................ | 74/720 |
| 4,978,178 | A * | 12/1990 | Engle ........................... | 303/13 |
| 5,038,896 | A * | 8/1991 | Wirth ..................... | 188/153 R |
| 5,201,890 | A * | 4/1993 | Sauer et al. ................. | 188/107 |
| 5,291,764 | A * | 3/1994 | Chang .......................... | 70/202 |
| 5,549,363 | A * | 8/1996 | Kanjo et al. ................... | 303/7 |
| 5,566,795 | A * | 10/1996 | Barefoot ..................... | 188/294 |
| 5,586,812 | A * | 12/1996 | Kanjo et al. ................... | 303/7 |
| 5,794,739 | A * | 8/1998 | Ring et al. .............. | 188/153 R |
| 5,813,731 | A * | 9/1998 | Newman et al. .............. | 303/89 |
| 6,039,158 | A * | 3/2000 | Fox et al. .................... | 188/162 |
| 6,170,619 | B1 * | 1/2001 | Sheriff et al. ............... | 188/107 |
| 6,186,602 | B1 * | 2/2001 | Jonner et al. ............. | 303/115.4 |
| 6,364,069 | B1 * | 4/2002 | Ring ..................... | 188/1.11 R |
| 6,364,428 | B1 * | 4/2002 | Labriola et al. .............. | 303/13 |
| 6,394,233 | B1 * | 5/2002 | Kanjo et al. ........... | 188/1.11 R |

(Continued)

*Primary Examiner*—Pam Rodriguez
(74) *Attorney, Agent, or Firm*—James Ray & Assoc.

(57) ABSTRACT

An apparatus engageable with a hand brake assembly for automatically applying at least one brake secured to a railway vehicle. The apparatus comprises an operating mechanism which is a two stage pneumatic cylinder having a primary portion for initial phase of the brake application and a secondary portion for the final brake application to apply high forces and to comply with AAR requirements. A source of fluid pressure is connected to the operating mechanism for periodically supplying a predetermined pressure thereto. A first control device is connected to the source of the fluid pressure for initiating the supply of such predetermined pressure to the operating mechanism. A second control device is connected to the source of the fluid pressure for regulating the supply of such predetermined pressure to the operating mechanism thereby causing an automatic application of such brake by the hand brake assembly.

21 Claims, 7 Drawing Sheets

U.S. PATENT DOCUMENTS

| | | | |
|---|---|---|---|
| 6,394,559 B1 * | 5/2002 | Ring et al. | 303/13 |
| 6,397,978 B1 * | 6/2002 | Jackson et al. | 188/33 |
| 6,578,679 B1 * | 6/2003 | Hill et al. | 188/170 |
| 6,709,068 B1 * | 3/2004 | Herron | 303/13 |
| 6,848,754 B1 * | 2/2005 | Ring et al. | 303/71 |
| 6,902,042 B1 * | 6/2005 | Ring et al. | 188/33 |

* cited by examiner

TWO-STAGE CYLINDER FOR APPLYING AUTOMATIC SET AND RELEASE HAND BRAKE

CROSS-REFERENCES TO RELATED APPLICATIONS

This application is closely related to U.S. Pat. No. 6,709,068, titled "Automatic Set and Release Hand Brake", Issued on Mar. 23, 2004; and to U.S. Pat. No. 6,848,754, titled "Automatic Application Hand Brake", issued on Feb. 1, 2005; and to U.S. Pat. No. 6,902,042, titled "Automatic Application Hand Brake Winding Mechanism", issued on Jun. 7, 2005. The above patents are owned by the assignee of the present invention and the teachings of these patents are incorporated herein by reference thereto.

FIELD OF THE INVENTION

The present invention relates, in general, to hand brake assemblies for use on railway type vehicles and, more particularly, this invention relates to an apparatus to automatically activate and apply the brakes on a railway vehicle without requiring an operator to manually wind the chain on such hand brake.

BACKGROUND OF THE INVENTION

Prior to the conception and development of the present invention, railway car hand brake mechanisms were well known in the art. They usually include a large, rotatable hand wheel disposed in a vertical plane and mounted on a shaft which, through a gear train, can rotate a chain drum to wind up a chain that is secured at its end remote from the chain drum to the brake rigging of the railway car. As the hand wheel is rotated in one direction, the brakes are applied and rotation of the hand wheel shaft in the opposite direction is prevented by a pawl, which engages a detent wheel on the hand wheel shaft.

The brakes may be released by disengaging the pawl from the detent wheel but this causes rapid rotation of the hand wheel and the gears of the gear train. To avoid rapid rotation of the hand wheel, hand brake mechanisms have been devised which are known as "quick release" mechanisms. Generally these quick release mechanisms include a releasable connecting means between the hand wheel shaft and the gear train. When the connecting means is released, the gears of the gear train rotate rapidly, without constraint by the pawl and detent wheel, but the hand wheel remains stationary.

The Association of American Railroads (AAR) promulgates specifications for the design and operation of railway car hand brake mechanisms. Vertical wheel, gear train, hand brake mechanisms are classified in three categories, namely:

(1) Standard power—provides an average force on the chain of 3350 lbs. with a 125 lb. turning force applied to the rim of a wheel twenty-two inches in diameter.
(2) Intermediate power—provides an average force on the chain of 4475 lbs. with a 125 lb. turning force applied to the rim of a wheel twenty-two inches in diameter.
(3) High power—provides an average force on the chain of 6800 lbs. with a 125 lb. turning force applied to the rim of a wheel twenty-two inches in diameter.

After setting of the brakes, when the hand brake mechanism is released the gears of the gear train rotate rapidly. This results in the gears and other components being subjected to high forces and to shock, particularly, when the chain becomes fully let-out from the chain drum.

In recent times, the AAR has added a life cycle test to its specifications, and hand brake mechanisms which do not meet the life cycle test cannot be sold for use on railway cars operated in interchange service on United States railroads. The AAR life cycle test for quick release brakes requires that such latter brakes withstand 3000 quick release operations.

To meet such life cycle test requirements, even standard power hand brake mechanisms had to be modified when the life cycle test was adopted. When intermediate power hand brake mechanisms of the type sold prior to the adoption of the life cycle test were subjected to the life cycle test, it was found that the components thereof wore prematurely or were damaged, and it was found to be necessary to add a shock retarder, or absorber, external to the hand brake mechanism, to overcome such wear and damage. Of course, such an external shock retarder is undesirable not only because it is external to the hand brake mechanism but also because of the additional cost and because it requires field modification of the equipment on a railway car if the intermediate power hand brake mechanism is used to replace a standard power hand brake mechanism.

High power hand brake mechanisms sold prior to the adoption of the life cycle test were similarly unable to pass the life cycle test. It should be borne in mind that such high power brake mechanisms normally have additional gears to provide the desired force on the chain, and this results in a higher speed of rotation of at least some of the gears during release of the hand brake mechanism.

Although the use of an external shock retarder might have solved the problems with the higher power hand brake mechanism, a change in the AAR specifications would have been required to permit the use of such an external shock retarder. Attempts were made to redesign the high power hand brake mechanism, such as by making it stronger, so that it would meet the life cycle test without the use of an external shock retarder, but the attempts were not successful.

One of the characteristics of railway car brakes with which the invention is concerned is that the force applied to the chain, and hence, the parts of the hand brake, is non-linear and depends on the extent to which the brakes are applied or released. Thus, as the brakes are applied, relatively little force is required to take up the slack in the chain and the brake rigging, but to meet AAR requirements, the final force on the chain must be as set forth above, namely, 3350 lbs. for a standard power brake, 4475 lbs. for an intermediate power brake and 6800 lbs. for a high power brake.

After slack in the rigging is taken up, which may require, for example, 5–15 inches of chain travel, the force on the chain increases exponentially, e.g. from 200 lbs. to the final value, as the brake hand wheel is further turned to set the brakes. In reaching the final value after the slack is taken up, the chain may travel only two or three inches.

Similarly, when the hand brake is released, the chain force decreases exponentially and reaches a relatively small value shortly after the hand brake is released. The aforementioned co-pending application teaches a single stage, double acting cylinder which displaces the same volume of fluid pressure with each stroke regardless of the resulting force in the hand break mechanism. As a result, a partial amount of fluid pressure is being wasted at the beginning of the brake application cycle, where relatively little force is required to take up the slack in the chain. Since the source of said fluid pressure is typically an emergency reservoir having a predetermined volume, less fluid pressure will be available at the end of the brake application to meet chain force requirement.

As it can be seen from the above discussion, it would be advantageous to optimize the consumption of fluid pressure so that less fluid is consumed during the first stage of brake application leaving more fluid available during the critical end stages of brake application when higher pressure is necessary to meet the minimum chain force requirements.

SUMMARY OF THE INVENTION

The present invention comprises a two-stage application cylinder, having a primary drive rod and a secondary drive rod. A drive arm is attached to the primary drive rod at one end and engages a lever at the distal end. An operating pawl is attached to the lever and a spring means is provided for urging the operating pawl into contact with a ratchet. This ratchet is engageable with at least one gear of a hand brake gear assembly disposed in a housing member of the hand brake assembly. At the beginning of the braking cycle, application of a force within the application cylinder causes the primary drive rod and drive arm to move outwardly from the cylinder and apply a downward force to the lever, which causes the operating pawl to engage a tooth within the ratchet. A primary return spring is provided within the application cylinder to urge the drive arm back to its original position. Rotation of the ratchet causes the gear of the hand brake gear assembly to rotate in a direction, which will cause an application of the brake means. Repeated applications of pressure within the application cylinder enables the gear of the hand brake gear assembly to rotate a sufficient amount to result in an application of the brakes. A holding pawl is also provided which cooperates with the ratchet. At the end of the braking cycle, continuing application of the fluid pressure within the cylinder causes the secondary drive rod to move outwardly from the cylinder and apply a required force to complete a braking application. At least one control valve means is engageable with the trigger attached to lever to control the operation of the application cylinder. At least one control valve means is also provided to redirect the path of the fluid pressure to the other side of the cylinder and aid a return spring in completely returning the primary piston to its original position.

OBJECTS OF THE INVENTION

It is therefore an object of the present invention to provide an automatic application hand brake, which reduces the consumption of fluid pressure during the first stages of brake application when minimal force is realized within the winding apparatus hence conserving fluid pressure for the critical end of the application during which time higher pressure is required to achieve the minimum chain force required for braking.

It is a further object of the present invention to provide an automatic application hand brake, which can be converted for use with the presently used automatic activation hand brake winding mechanisms.

In addition to the various objects and advantages of the present invention which have been generally described above, there will be various other objects and advantages of the invention that will become more readily apparent to those persons skilled in the relevant art from the following more detailed description of the invention, particularly, when the detailed description is taken in conjunction with the attached drawing figures and with the appended claims.

DETAILED DESCRIPTION OF THE INVENTION

Figure 1:
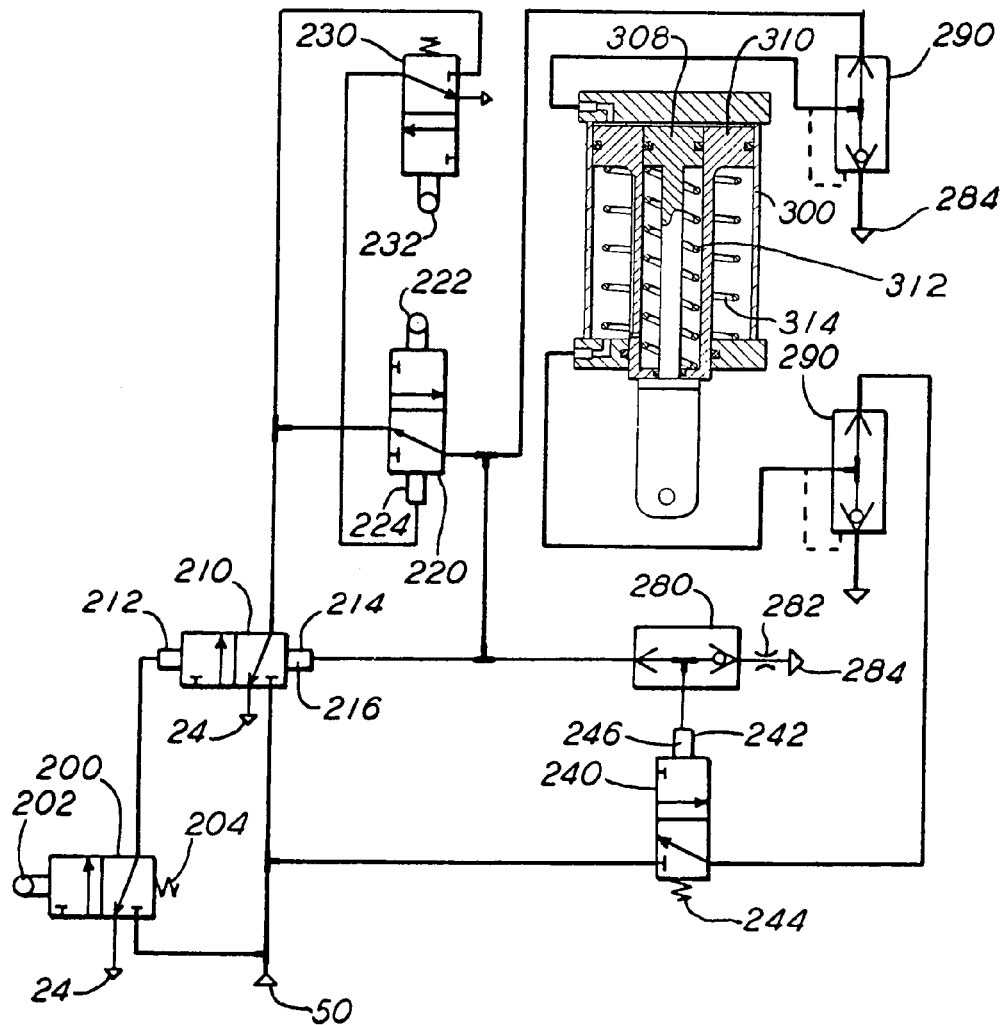
FIG. 1 is a schematic illustration of the presently preferred control configuration for use with an automatic activation hand brake winding mechanism including the presently preferred application cylinder.

The following background information is provided to assist the reader to understand the environment in which the invention will typically be used. The terms used herein are not intended to be limited to any particular narrow interpretation unless specifically stated otherwise in this document.

Prior to proceeding to the more detailed description of the various embodiments of the present invention, for the sake of clarity and understanding of such invention, it should be noted that identical components having identical functions have been identified with identical reference numerals throughout each of the figures illustrated herein.

In reference to FIGS. 2 through 7, the automatic application hand brake of the invention comprises an operating means, generally designated 300, engageable with such hand brake. In the presently preferred embodiment operating means 300 includes a spring return, two-stage cylinder. The presently preferred pressure fluid is pneumatic. Alternatively, hydraulic fluid pressure can be utilized when required. Pneumatic cylinder 300 comprising an outer cylindrical casing member 324, a primary piston member 308 having a first surface and an opposed second surface and being mounted for reciprocal movement within a cylindrical casing formed by the inner surface of the secondary rod 304.

Upon the application of pneumatic pressure thereto, a convention seal member 326 adjacent a first end of the piston 308 and contacting the inner surface of the secondary rod 304 so as to provide an airtight chamber at one end of the cylindrical member such that application of pneumatic pressure therein and against the first end of the piston 308 enables forward movement of piston 308. A primary return spring 312 is provided to return the piston 308 to its initial position. The opposed second end of the piston 308 is attached to a first portion of primary drive rod 302. A second portion of the primary drive rod 302 is connected to a first portion of the drive arm 306, having a second portion engageable with a lever 152.

Furthermore, pneumatic cylinder 300 includes a secondary piston member 310 having a first surface and an opposed second surface and being mounted for reciprocal movement along the inner surface of cylindrical casing 324. Upon the application of pneumatic pressure thereto, a conventional seal member 328 adjacent a first end of the piston 310 and contacting the inner surface of the cylindrical casing member 324 so as to provide an airtight chamber at one end of the cylindrical member such that application of pneumatic pressure therein and against the first end of the piston 310 enables forward movement of such piston 310.

A secondary return spring 314 is provided to return piston 308 to its initial position. The opposed second end of piston 310 is connected to the second portion of the secondary drive rod 304. A first pneumatic fluid pressure communications means 320 disposed within cylindrical casing 324 enables the application into and the evacuation of the pneumatic fluid pressure from the piston cavity.

The first fluid pressure communication means 320 may be any well known type capable of supplying pneumatic fluid pressure into the piston cavity. A second pneumatic fluid pressure communication means 316 disposed within cylindrical casing 324 enables application into and evacuation of the pneumatic fluid pressure from the rod side of the secondary piston 310 cavity. Furthermore, such fluid pressure communication means 316 enables application into and evacuation of fluid pressure from the rod side of the primary piston 308 cavity when the secondary rod is in the steady state position shown in FIGS. 2 and 3.

Figure 2:
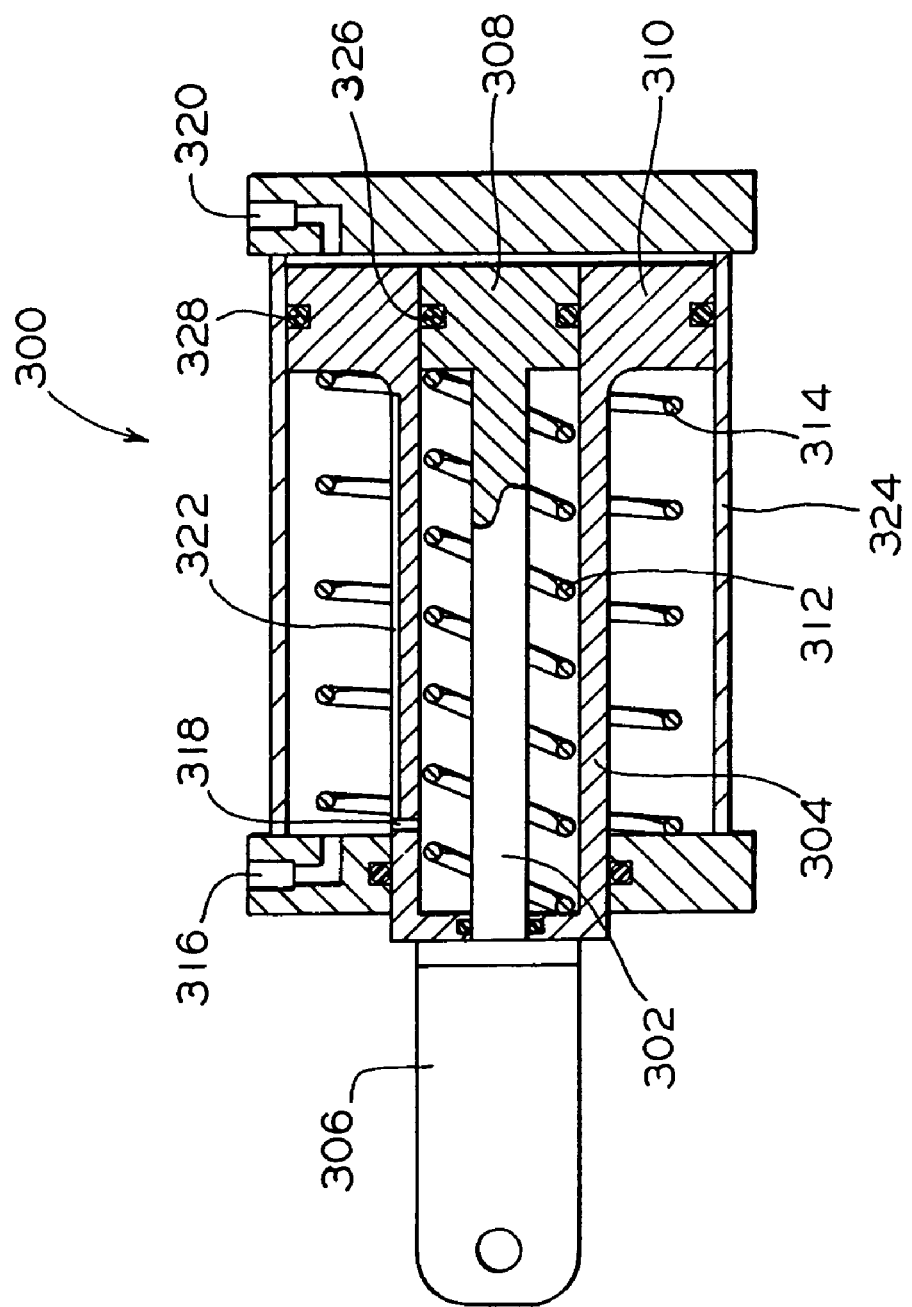
FIG. 2 is a schematic illustration of the present invention with the primary rod in the substantially retracted position.
Figure 3:
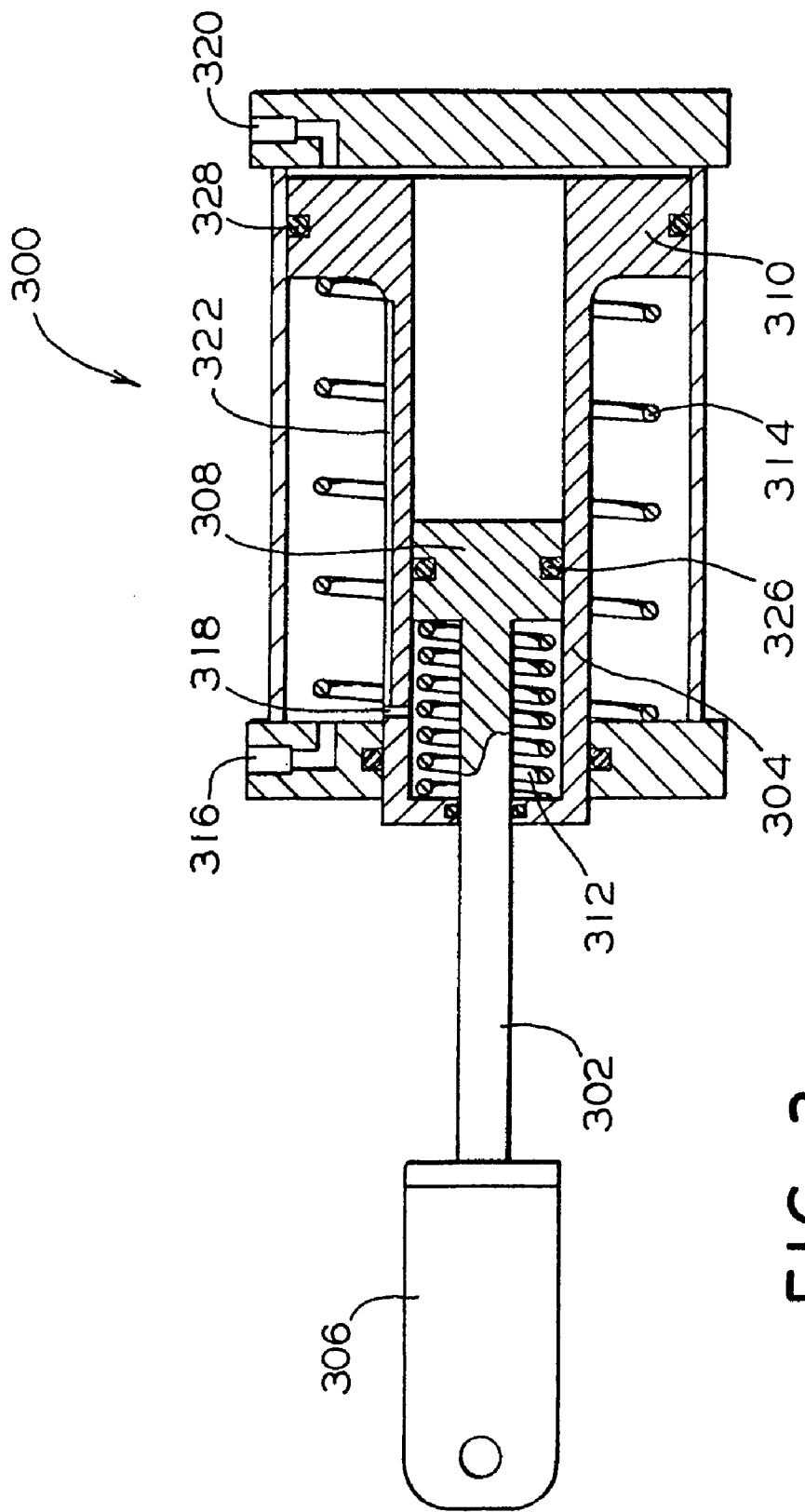
FIG. 3 is a schematic illustration of the present invention with the primary rod in the substantially extended position.

Additionally a third fluid pressure communication means 318 of predetermined geometry disposed within cylinder 300 enables the application and evacuation of fluid pressure between the rod side of the primary piston 308 cavity and the rod side of the secondary piston 310 cavity as well as to allow for a predetermined rate of flow of pneumatic fluid, acting in cooperation with fluid pressure communication means 316, to maintain a predetermined range of fluid pressure acting against the rod side of the secondary piston 310 in cooperation with spring 314 to maintain the secondary piston in a steady state during forward travel of primary piston 308 as shown in FIG. 2.

Figure 4:
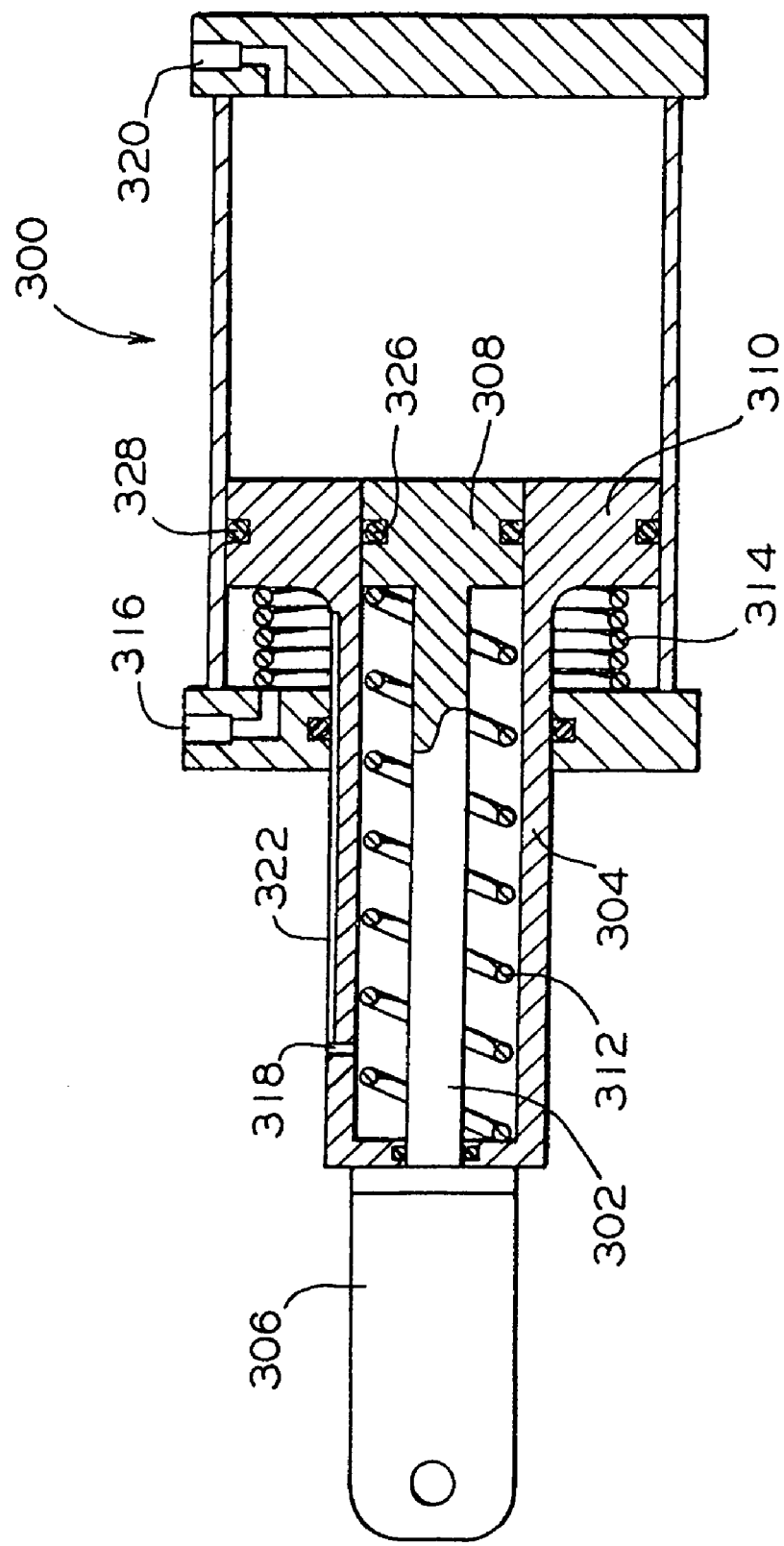
FIG. 4 is a schematic illustration of the present invention with the primary rod and secondary rod in the substantially extended position.

Furthermore, fluid pressure communication means 318 enables application and evacuation of fluid from the rod side of the primary piston 308 cavity when the secondary rod 304 is in an extended position as shown in FIG. 4. At least one operating pawl (not shown) is attached to the lever 152 and a spring means 156 is provided for urging the operating pawl (not shown) into contact with a ratchet (not shown). This ratchet (not shown) is engageable with at least one gear 14 of a hand brake gear assembly 40 disposed in a housing member of the hand brake assembly 20. Initial application of fluid pressure through first fluid communication means 320 produces a force against the primary drive rod piston 308 of the operating cylinder 300 which causes the drive arm 306 to move outwardly from the cylinder and apply a downward force to the lever 152 which causes the operating pawl (not shown) to engage a tooth within the ratchet (not shown). Upon retraction, primary rod return spring 312 is provided within the operating cylinder 300 to urge the drive arm 306 back to its original position with the aid of fluid pressure entering through secondary rod orifice 318. Rotation of the ratchet (not shown) causes the gear 14 of the hand brake gear assembly 40 to rotate in a direction which will cause an application of the brake means. A holding pawl (not shown), is also provided which cooperates with a ratchet (not shown). At least one control valve is engageable with the trigger 172 attached to lever 152 to control the operation of the operating cylinder 300. This control valve system includes a first reciprocating valve means 220 and a second reciprocating valve means 230. At least one control valve means 240 is also provided to redirect the path of the fluid pressure through end fluid communication means 316 and through secondary rod orifice 318 of the cylinder 300 to aid a primary rod return spring 312 in completely returning the piston 308 to its fully returned position.

Refer now, more particularly to FIG. 1, where under steady state conditions, the primary cylinder piston 308 is completely returned by it's spring 312. Consequently, there is no air pressure behind the piston 308, and to start an application all that is required is to activate pushbutton 202 attached to application valve member 200 which begins the process of winding up the brake. It allows a source of fluid pressure 50 from an emergency reservoir (not shown) to flow through the valve 200 and into pilot 212 attached to activation valve 210. The build-up of pressure in the pilot 212 to a predetermined value causes valve 210 to open and allow fluid pressure 50 to flow through the valve 210 to a first reciprocating valve 220 and a second reciprocating valve 230.

Figure 5:
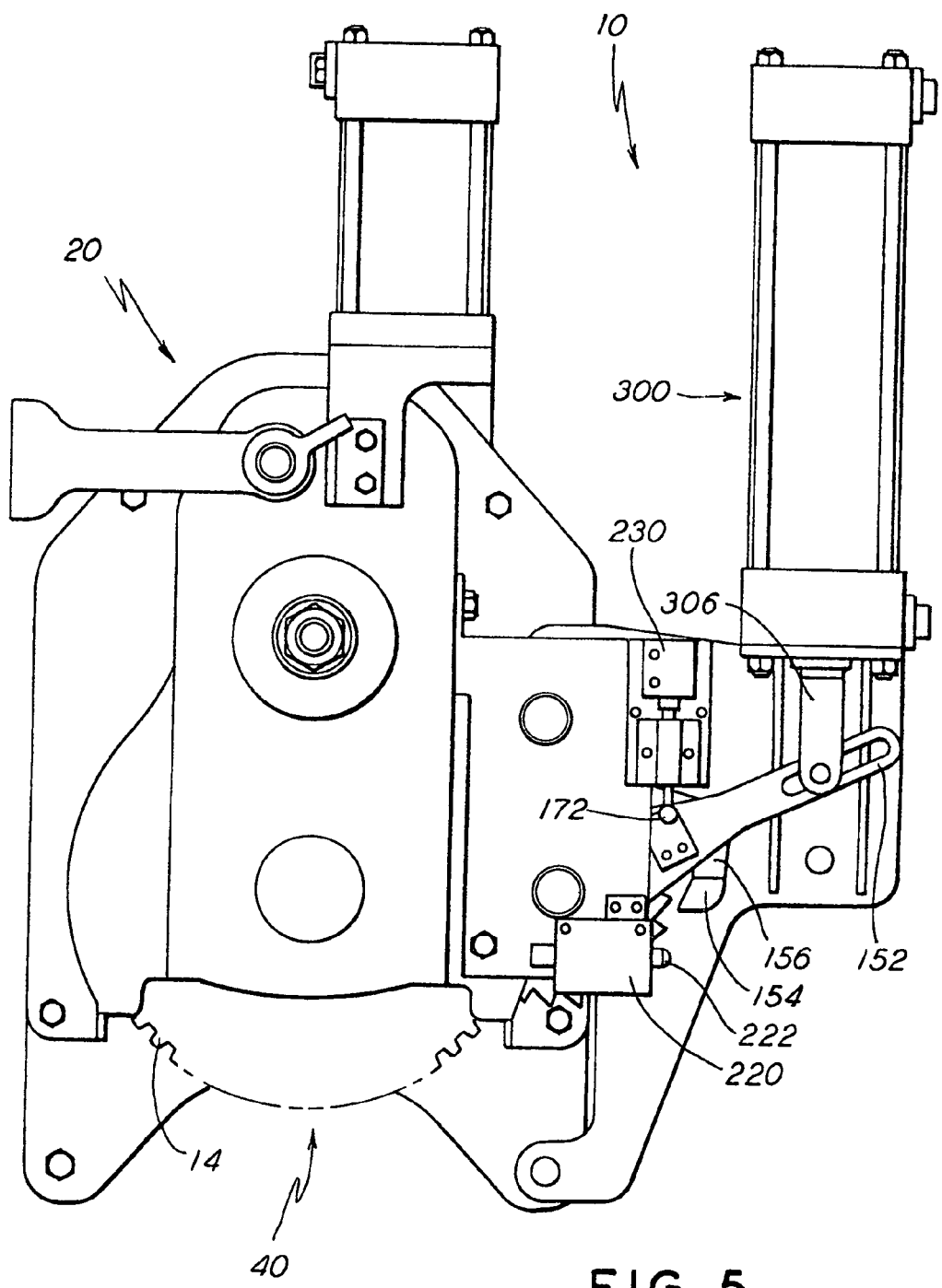
FIG. 5 is a front elevation view of a hand brake assembly incorporating the present invention, with the application cylinder primary rod in a substantially retracted position.
Figure 6:
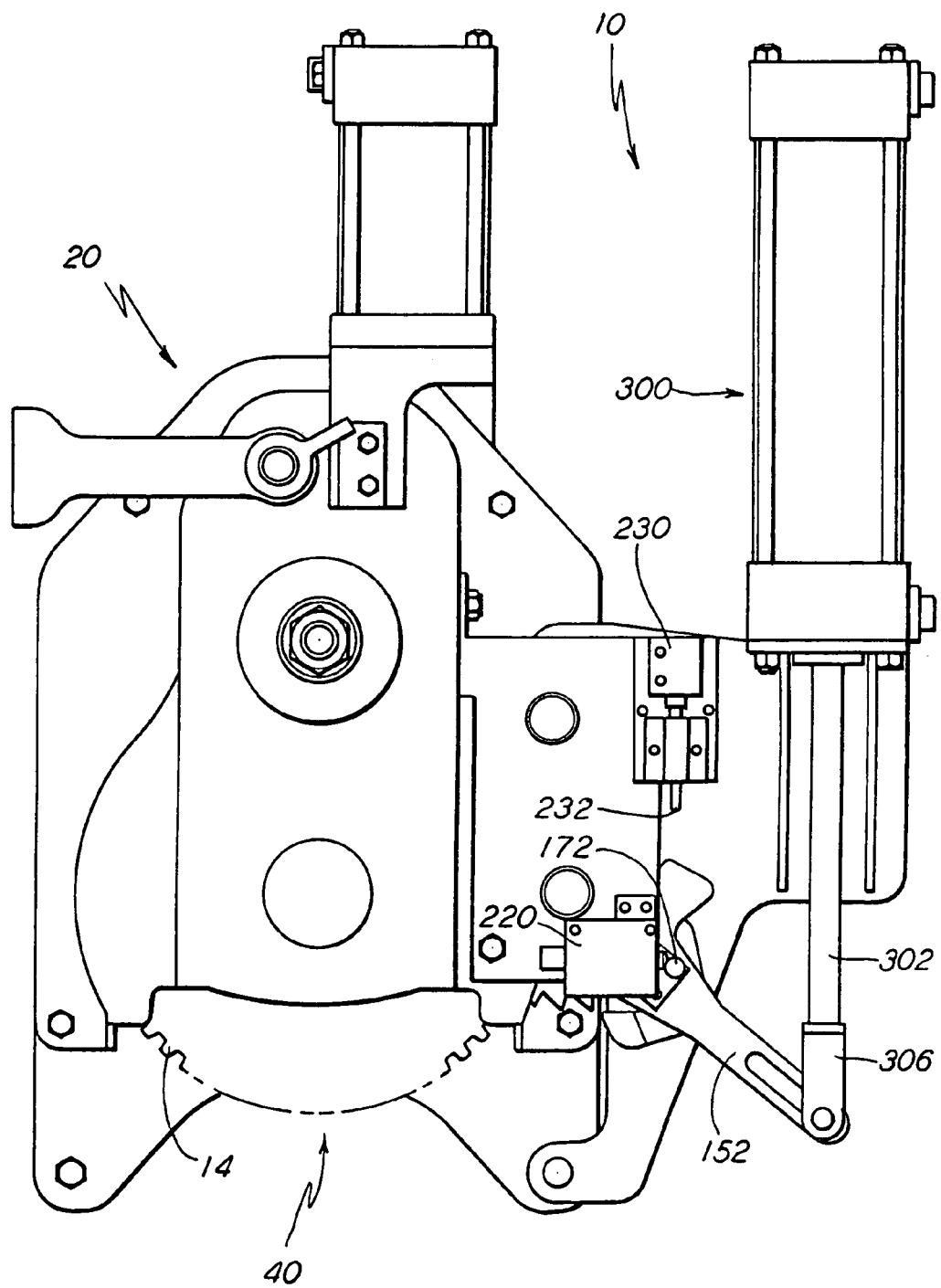
FIG. 6 is a front elevation view of a hand brake assembly incorporating the present invention, with the application cylinder primary rod in a substantially extended position.
Figure 7:
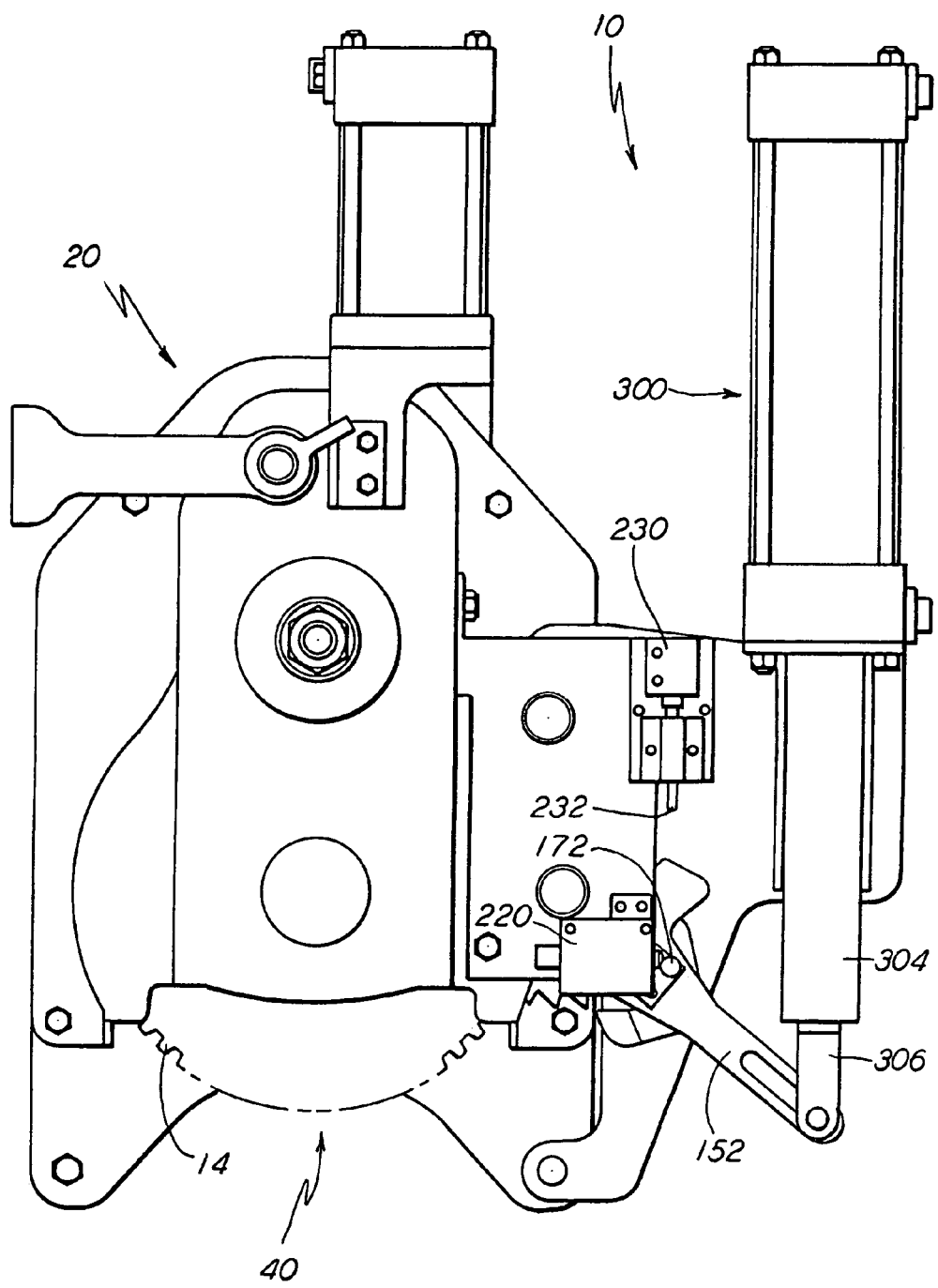
FIG. 7 is a front elevation view of a hand brake assembly incorporating the present invention, with the application cylinder primary rod and secondary rod in substantially extended positions.

In further reference to FIG. 5, trigger 172 engages pushbutton 232 attached to valve 230 and allows fluid pressure 50 to flow through valve 230 into pilot 224 attached to first reciprocating valve 220. The predetermined pressure in the pilot 224 will cause the valve 220 to shift and allow fluid pressure 50 to flow through valve 220 in four directions. The primary directions of the fluid pressure will be to the backside of the piston 308, causing the piston 308 to now drive the primary rod 302 down pushing the air back out of the cylinder to atmosphere through quick exhaust valve 290 and, more importantly, rotating lever 152 in a clock-wise direction, causing the hand brake 20 to wind up. Additionally, when the load is fully applied, the fluid pressure will flow to the pilot 214 attached to the activation valve 210 causing the valve 210 to shift into the vented position and cut-off fluid pressure supply 50 from the emergency reservoir.

Furthermore, the fluid pressure will flow through the quick exhaust valve 280 to the pilot 242 attached to the change-over valve 240, causing valve 240 to shift and allow fluid pressure supply 50 to flow to the front side of the piston 308 further aiding its return to the original position.

Yet additionally, the fluid pressure will be exhausted to atmosphere through choke 282. Once the piston 308 reaches the bottom of its stroke, the trigger 172 will activate pushbutton 222 attached to the first reciprocating valve 220, closing valve 220. Furthermore, the return spring 312 is going to drive the piston 308 to its original position pushing the air back out of the cylinder to atmosphere 284 through quick exhaust valve 290. The trigger 172 engages pushbutton 232, opening valve 230, which is going to cause air to go back in the cylinder again through first reciprocating valve 220. In the first stages of brake application when minimum force is required, winding of the brake mechanism is accomplished solely through the reciprocation of the primary rod 302 by repeated applications of pressure within the operating cylinder 300 through the control valve means and return spring 312 described above, which enables the gear of the hand brake gear assembly to rotate a sufficient amount to eliminate the slack within the brake application mechanism.

As the slack within the brake mechanism is diminished, the force required to urge rotation of the hand brake gear increases. Ultimately, the force transmitted through the primary rod 302 is not of sufficient magnitude to overcome the resulting force in the mechanism. Fluid pressure 50 entering through first fluid communication means 320 accumulates in the cylinder and produces an increasing force on the secondary rod piston 310. As this force increases, the secondary rod 304 becomes active and begins to move outwardly. At a predetermined point in this extension, secondary rod orifice 318 is restricted thus preventing fluid pressure from entering the primary cylinder. Exhaust means disposed within such secondary rod are provided to exhaust fluid pressure outward upon movement of the secondary drive rod. In the presently preferred embodiment the means include a longitudinal cavity 322 disposed in the outer surface of the secondary rod 304, such cavity 322 is oriented parallel to the secondary rod axis, producing an exhaust path to vent fluid residing in the drive rod cavity of the cylinder at a second predetermined point in its travel, hence allowing further extension of the secondary drive rod 304.

Alternatively, the exhaust means can also be created using other well-known means, including a plurality of valves, which do not rely on similar cross sectional variations of the secondary rod. During its outward movement, the secondary rod 304 leading end encounters the drive arm 306 attached to the primary rod, and, in cooperation with the primary rod, urges additional rotation of the brake gear to achieve the desired braking force. Upon achieving such load, the pressure in the line between valve 220 and valve 290 will increase causing valve 210 to shift and vent to atmosphere, but more importantly, closing the supply of the fluid pressure 50. At the same time, the predetermined pressure in the pilot 242 will cause valve 240 to shift allowing fluid pressure to flow to the bottom side of the cylinder 300 and cooperate, with return springs 312 and 314 to disengage the holding pawl (not shown) within brake apparatus 20.

While the presently preferred embodiment and various additional alternative embodiments for carrying out the instant invention have been set forth in detail in accordance with the Patent Act, those persons skilled in the hand brake art to which this invention pertains will recognize various alternative ways of practicing the invention without departing from the spirit of the invention and scope of the appended claims.

I claim:

1. An apparatus engageable with a hand brake assembly for automatically applying at least one brake means secured to a railway vehicle with such hand brake assembly, said apparatus comprising:
    (a) a two-stage operating means having at least a portion thereof engageable with at least one gear of a gear assembly disposed in a housing member of such hand brake assembly for operating upon supply of a predetermined pressure such gear assembly in a direction witch will cause an application of such at least one brake means, wherein said operating means is operable in a first stage to generate a low force causing an initial brake application which requires said low force to partially wind up a chain of such hand brake assembly and in a second stage to generate a high force causing a final brake application which requires said high force to apply such at least one brake means;
    (b) a source of fluid pressure connected to said operating means for periodically supplying said predetermined pressure to said operating means at least sufficient to cause such application of such at least one brake means; and
    (c) a means connected to said source of fluid pressure for initiating said supply of said predetermined pressure to said operating means thereby causing an automatic application of such at least one brake means by such hand brake assembly.

2. An apparatus for automatically applying at least one brake means secured to a railway vehicle with a hand brake assembly, according to claim 1, wherein said apparatus further includes a control means connected intermediate said operating means and said source of fluid pressure for controlling said predetermined pressure being periodically supplied to said operating means.

3. An apparatus for automatically applying at least one brake means secured to a railway vehicle with a hand brake assembly, according to claim 1, wherein said two-stage operating means includes a two-stage cylinder having:
    (a) a cylindrical casing;
    (b) a fluid pressure operated primary piston axially movable in said cylindrical casing;
    (c) a primary drive rod connected to said primary piston at one end, said primary drive rod connected to a drive arm at a distal end, said primary drive rod movable in an outwardly direction for enabling said initial brake application requiring said low force to partially wind up a chain of such hand brake assembly and apply such at least one brake means;
    (d) a primary spring means for returning said primary piston to its original position;
    (e) a first fluid pressure communicating means disposed adjacent said primary piston for applying fluid pressure into and evacuating fluid pressure from said two-stage cylinder;
    (f) a fluid pressure operated secondary piston axially movable in said cylindrical casing;
    (g) a secondary drive rod connected to said secondary piston at one end, said secondary drive rod engageable with said drive arm at a distal end, said secondary drive rod movable in an outwardly direction for enabling said final brake application requiring said high force to apply such at least one brake means;
    (h) a secondary spring means for returning said secondary piston to its original position;
    (i) a second fluid pressure communicating means disposed within said cylindrical casing adjacent said primary and said secondary drive rods, said second fluid pressure communicating means supplying fluid pressure into and evacuating fluid pressure from said two-stage cylinder; and
    (j) a third fluid pressure communication means having a predetermined geometry and disposed within said two-stage cylinder for enabling application and evacuation of fluid pressure between a rod side of a primary piston cavity and a rod side of a secondary piston cavity, said third fluid pressure communication means allowing for a predetermined rate of flow of said fluid and acting in cooperation with said second fluid pressure communication means to maintain a predetermined range of fluid pressure acting against said rod side of said secondary piston in cooperation with said secondary spring means to maintain said secondary piston in a steady state during outward travel of said primary piston.

4. An apparatus for automatically applying at least one brake means secured to a railway vehicle with a hand brake assembly, according to claim 3, wherein said apparatus further includes means for exhausting said fluid pressure from said two-stage cylinder.

5. An apparatus for automatically applying at least one brake means secured to a railway vehicle with a hand brake assembly, according to claim 4, wherein said exhaust means is a longitudinal cavity disposed in an outer surface of said secondary drive rod, said longitudinal cavity oriented parallel to an axis of said secondary drive rod, said longitudinal cavity producing an exhaust path to vent fluid residing in a drive rod cavity of said cylinder at a second predetermined point in its travel, hence allowing further extension of said secondary drive rod.

6. An apparatus for automatically applying at least one brake means secured to a railway vehicle with a hand brake assembly, according to claim 4, wherein said exhaust means includes a plurality of valves, which do not rely on similar cross sectional variations of said secondary drive rod.

7. An apparatus for automatically applying at least one brake means secured to a railway vehicle with a hand brake assembly, according to claim 1, wherein said operating means includes at least one valve means for connecting said source of fluid pressure to said operating means.

8. An apparatus for automatically applying at least one brake means secured to a railway vehicle with a hand brake assembly, according to claim 7, wherein said operating means includes a plurality of valve means for connecting said source of fluid pressure to said operating means.

9. An apparatus for automatically applying at least one brake means secured to a railway vehicle with a hand brake assembly, according to claim 8, wherein said apparatus further includes means for venting said fluid pressure from said plurality of valve means.

10. An apparatus for automatically applying at least one brake means secured to a railway vehicle with a hand brake assembly, according to claim 7, wherein said apparatus further includes means for venting said fluid pressure from said at least one valve means.

11. An apparatus for automatically applying at least one brake means secured to a railway vehicle with a hand brake assembly, according to claim 1, wherein said source of fluid pressure is pneumatic.

12. An apparatus for automatically applying at least one brake means secured to a railway vehicle with a hand brake assembly, according to claim 1, wherein said apparatus further includes a control valve means to redirect pressure fluid supply to an opposite side of said operating means.

13. An apparatus for automatically applying at least one brake means secured to a railway vehicle with a hand brake assembly, according to claim 1, wherein said apparatus further includes means for venting said fluid pressure from said operating means upon reversal of said operating means.

14. An apparatus for automatically applying at least one brake means secured to a railway vehicle with a hand brake assembly, according to claim 13, wherein said venting means is at least one quick exhaust valve.

15. An apparatus for automatically applying at least one brake means secured to a railway vehicle with a hand brake assembly, according to claim 13, wherein said venting means is a plurality of quick exhaust valves.

16. An apparatus for automatically applying at least one brake means secured to a railway vehicle with a hand brake assembly, according to claim 13, wherein said venting means is a fluid pressure line of a predetermined diameter.

17. An apparatus engageable with a hand brake assembly for automatically applying at least one brake means secured to a railway vehicle with such hand brake assembly, said apparatus comprising:
(a) a two-stage operating means having at least a portion thereof engageable with at least one gear of a gear assembly disposed in a housing member of such hand brake assembly for operating upon supply of a predetermined pressure such gear assembly in a direction which will cause an application of such at least one brake means, wherein said operating means is operable in a first stage to generate a low force causing an initial brake application which requires said low force to partially wind up a chain of such hand brake assembly and in a second stage to generate a high force causing a final brake application which requires said high force to apply such at least one brake means;
(b) a source of fluid pressure connected to said operating means for periodically supplying said predetermined pressure to said operating means at least sufficient to cause such application of such at least one brake means;
(c) a means connected to said source of fluid pressure for initiating said supply of said predetermined pressure to said operating means thereby causing an automatic application of such at least one brake means by such hand brake assembly;
(d) a control means connected intermediate said operating means and said source of fluid pressure for controlling said predetermined pressure being periodically supplied to said operating means; and
(e) a venting means connected to said operating means for venting said fluid pressure from said operating means.

18. An apparatus for automatically applying at least one brake means secured to a railway vehicle with a hand brake assembly, according to claim 17, wherein said operating means includes a plurality of valve means for connecting said source of fluid pressure to said operating means.

19. An apparatus for automatically applying at least one brake means secured to a railway vehicle with a hand brake assembly, according to claim 18, wherein said apparatus further includes means for venting said fluid pressure from said plurality of valve means.

20. An apparatus for automatically applying at least one brake means secured to a railway vehicle with a hand brake assembly, according to claim 17, wherein said source of fluid pressure is pneumatic.

21. A method of automatically applying at least one brake means secured to a railway vehicle with a hand brake assembly, said method comprising the steps of:
(a) actuating a primary piston and enabling movement of a primary drive rod attached to said primary piston in an outwardly direction for initial brake application requiring a low force to wind up a chain of said hand brake assembly;
(b) exhausting fluid pressure from a primary drive rod cavity into a secondary drive rod cavity to maintain a secondary piston in its original position for said initial brake application requiring said low force to wind up said chain of said hand brake assembly;
(c) actuating said secondary piston and enabling movement of a secondary drive rod attached to said secondary piston in an outwardly direction for a final brake application requiring a high force to apply said at least one brake means; and
(d) exhausting fluid pressure from said secondary drive rod cavity into atmosphere during outward movement of said secondary drive rod for said final brake application requiring said high force to apply said at least one brake means.

* * * * *